United States Patent [19]
Barenboim et al.

[11] Patent Number: 5,822,211
[45] Date of Patent: Oct. 13, 1998

[54] LASER TEXTURING APPARATUS WITH DUAL LASER PATHS HAVING AN INDEPENDENTLY ADJUSTED PARAMETER

[75] Inventors: Michael Barenboim, Boca Raton, Fla.; Peter Michael Baumgart, San Jose, Calif.; Peter P. Chrusch, Boynton Beach; Benny Michael Harper, Boca Raton, both of Fla.; Benjamin Kami, San Jose, Calif.; Pieter J. M. Kerstens, Boca Raton, Fla.; Michael Gerard Lisanke, Boynton Beach, Fla.; Huizong Lu, Coconut Creek, Fla.; Lanphuong Thi Pena, Fort Lauderdale, Fla.; Eric V. Schnetzer, Boynton Beach, Fla.; Hong S. Seing; Ali Reza Taheri, both of Boca Raton, Fla.; Andrew Ching Tam, Saratoga, Calif.

[73] Assignee: International Business Machines Corporation, Armonk, N.Y.

[21] Appl. No.: 748,642

[22] Filed: Nov. 13, 1996

[51] Int. Cl.⁶ .................................................... G06F 19/00
[52] U.S. Cl. ............................... 364/474.08; 219/121.77; 219/121.82
[58] Field of Search .......................... 364/474.01, 474.08; 219/121.77, 121.68, 121.82, 121.78, 121.79; 427/128, 554; 360/135; 428/694 TR, 694.56

[56] References Cited

U.S. PATENT DOCUMENTS

| | | |
|---|---|---|
| 4,770,532 | 9/1988 | Ito ............................................ 356/372 |
| 5,062,021 | 10/1991 | Ranjan et al. ........................... 360/135 |
| 5,108,781 | 4/1992 | Ranjan et al. .......................... 427/53.1 |
| 5,469,259 | 11/1995 | Golby et al. ............................. 356/351 |
| 5,586,040 | 12/1996 | Baumgart et al. .................. 364/474.08 |
| 5,595,791 | 1/1997 | Baumgart et al. ....................... 427/554 |
| 5,658,475 | 8/1997 | Baenboim et al. ................. 219/121.77 |

OTHER PUBLICATIONS

*Instruction Manual for Model 7300 Laser Systems*, Spectra–Physics Laser Diode Systems, Mountain View CA, 1990.

*Primary Examiner*—Paul P. Gordon
*Assistant Examiner*—Steven R. Garland
*Attorney, Agent, or Firm*—Richard A. Tomlin; Ronald V. Davidge

[57] ABSTRACT

A disk texturing process uses a single pulsed laser to texture disks within a first group, which are carried through the texturing process on a first spindle assembly, and from a second group, which are carried through the texturing process on a second spindle assembly. Preferably, disks from the first group are textured alternately with disks in the second group. A first level of least one texturing parameter is stored for use only as the process is applied to disks from the first group, while a second level of the same texturing parameter is stored for use only as the process is applied to disks from the second group. These levels may be derived from measurements of textured spots made with interferometric devices forming portions of a texturing station.

22 Claims, 4 Drawing Sheets

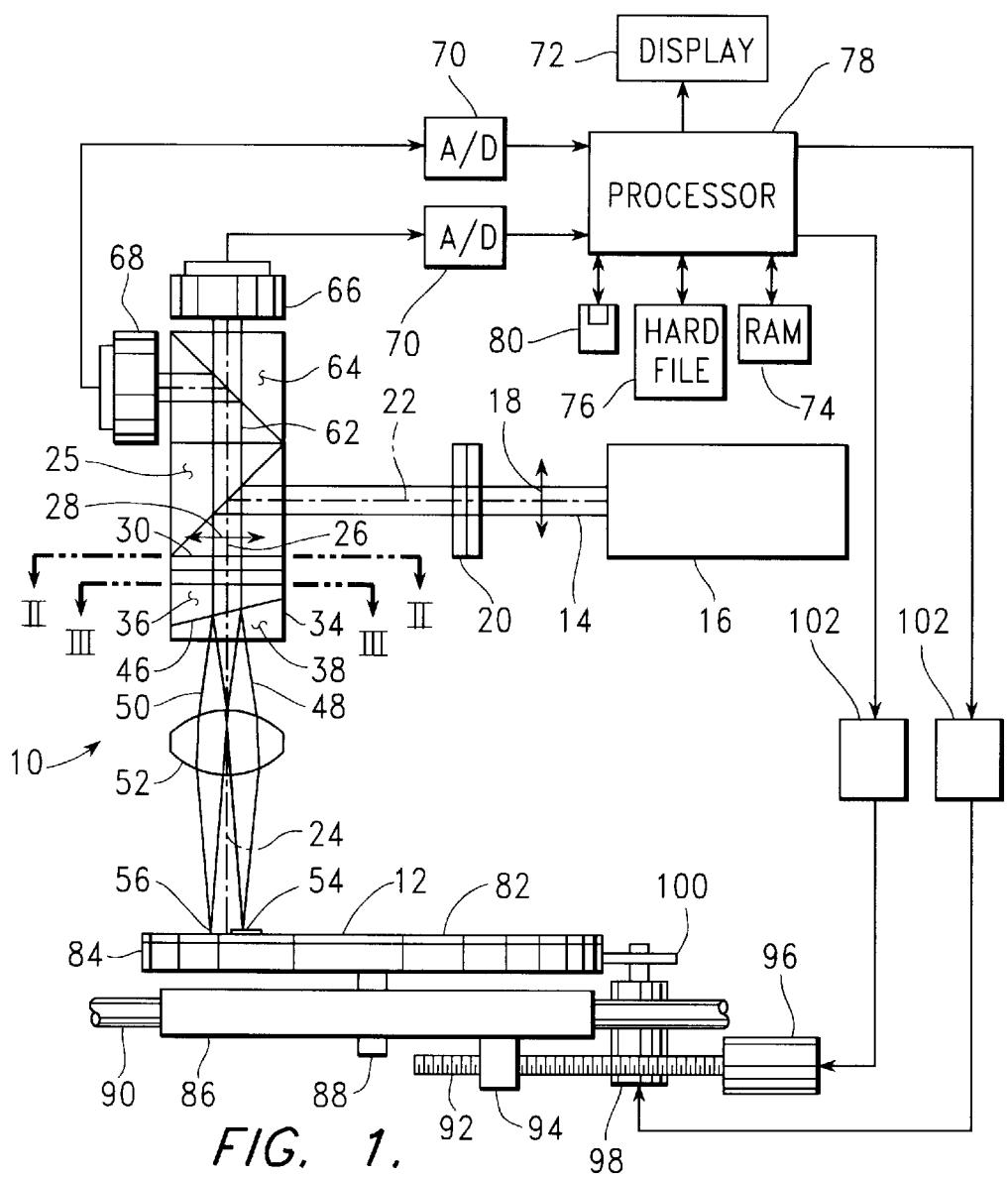
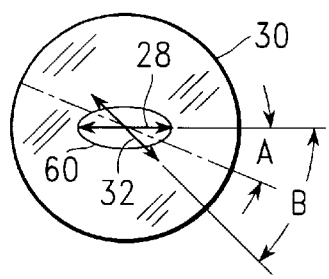
FIG. 2.
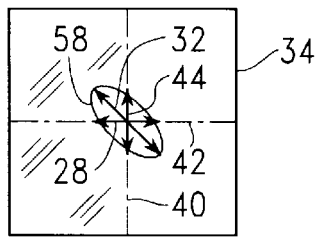
FIG. 3.
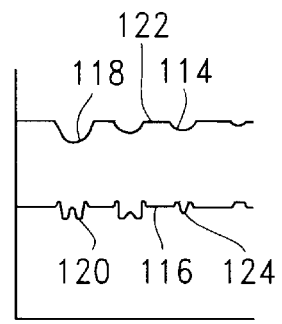
FIG. 5.
FIG. 1.

//<br>
LASER TEXTURING APPARATUS WITH DUAL LASER PATHS HAVING AN INDEPENDENTLY ADJUSTED PARAMETER

CROSS REFERENCE TO RELATED APPLICATIONS

This application is related to a U.S. application Ser. No. 08/426,778, filed Apr. 11, 1995, now abandoned, entitled "Apparatus and Method for Acquiring and Analyzing Interferometric Images," by Alan. D. Dorundo, et al., having a common assignee with the present invention, the disclosure of which is hereby incorporated for reference. This application describes a method for acquiring and analyzing interferometric images first to locate surface defects using moving images produced by a scanning motion, and then to analyze the defects found in this way using a static, imaging method.

A number of co-pending U.S. applications having a common assignee with the present invention describe apparatus and processes for texturing an annular portion of a magnetic disk, providing a Contact Start-Stop (CSS) region in which the magnetic head of a disk drive is placed as the rotation of the disk is stopped. The texturing process minimizes physical contact between the magnetic head and the disk, and hence minimizes damage to the magnetic head, as rotation of the disk is stopped and subsequently re-started. Exemplary of these applications are U.S. application Ser. No. 08/150,525, abandoned entitled "Procedure Employing a Diode-Pumped Laser for Controllably Texturing a Disk Surface," by Peter Baumgart, et al, filed Nov. 10, 1993 abandoned and continued as Ser. No. 601,887 on Feb. 15, 1996, with a divisional application Ser. No. 457,559 being filed from the original application on Jun. 1, 1995, and with a continuation Ser. No. 889,348, of the divisional application being filed on Jul. 8, 1997, the disclosure of which is hereby incorporated by reference; U.S. application Ser. No. 08/613,564, filed Mar. 11, 1996, which as subsequently issued as U.S. Pat. No. 5,658,475, entitled "Apparatus for Laser Texturing Disks," by M. Barenboim, et al, the disclosure of which is hereby incorporated by reference; and U.S. application Ser. No. 08/707,383 pending, entitled "Optical Apparatus for Dual Beam Laser Texturing," by Michael Barenboim, et al., filed Sep. 4, 1996, the disclosure of which is hereby incorporated by reference.

A co-pending U.S. application Ser. No. 08/710,807 pending, entitled "Optical Differential Profile Measurement and Apparatus," filed Oct. 10, 1996, and having a common assignee with the present application, describes an interferometer configured particularly to determine a difference in height between two spaced-apart test spots on a test surface.

A co-pending U.S. application Ser. No. 08/710,806, entitled "Optical Apparatus for Inspecting Laser Texture, filed Oct. 10, 1996, now U.S. Pat. No. 5,699,160 and having a common assignee with the present invention, describes the use of an interferometer to measure textured spots extending in a pattern along the surface of a disk. In a first embodiment, following a laser texturing process producing a spiral pattern of textured spots, the disk and the interferometer are moved, relative to one another, so that one test spot of the interferometer traverses the textured spots while the other test spot is moved along a flat portion of the disk surface. In second embodiment, the interferometer is built into the laser texturing device, so that feedback is provided to vary the texturing parameters on a real-time basis.

A co-pending U.S. application Ser. No. 08/710,818, entitled "Apparatus for Optical Differential Measurement of Glide Height Above a Magnetic Disk," filed Oct. 10, 1996, now U.S. Pat. No. 5,703,684 and having a common assignee with the present application, describes the use of an interferometer to measure changes in the glide height of a simulated magnetic head above a magnetic disk surface under test.

A co-pending U.S. application Ser. No. 08/710,805, entitled "Optical Apparatus for Rapid Defect Analysis," filed Oct. 10, 1996, and having a common assignee with the present invention, describes apparatus including a first type of interferometer rapidly scanning a surface for defects and a second type of interferometer providing surface profiles of the defects.

BACKGROUND OF THE INVENTION

1. Field of the Invention

This invention relates to apparatus and method for varying the attenuation levels of laser beams used to texture magnetic disks, and, more particularly, to the sequential variation of attenuation levels and other parameters within a disk texturing device having two optical paths used in an alternating fashion to texture disks from separate sources.

2. Background Information

Current hardfile drives use a Contact Start-Stop (CSS) system allowing a magnetic head, used to read and write data, to contact the surface of a magnetic disk in a specific CSS region when the disk is stationary. Thus, before the rotation of a spinning disk has stopped, the magnetic head is moved to the CSS region, where the magnetic head settles on the surface of the disk. When the disk again starts to rotate, the magnetic head slides along the disk surface in this region, until the laminar air flow at the disk surface, due to its rotation, fully lifts the magnetic head from the disk surface.

After the magnetic head is lifted in this way, it is moved from the CSS region to another region of the disk to read and write data. The CSS region is preferably textured to minimize physical contact between the magnetic head and the disk surface. In this way, the contact stick-slip phenomenon often called "stiction" and other frictional effects are minimized, along with the resulting wear of the magnetic head surface. Outside the CSS region the remainder of the disk surface preferably retains a specular smoothness to permit high-density magnetic data recording.

The beneficial effects of surface texturing are best achieved if tight control is placed on various parameters describing the shape, or profile, of the individual textured spots.

To maximize usage of the texturing laser station, and hence of the laser texturing tool itself, what is needed is a method for supplying disks from opposing (i.e. right and left) sides to the laser station, so that an output beam from a single laser can be used to texture disks from the opposing sides in an alternating fashion. However, if this process is performed using different optical paths to the disks being supplied from opposite sides, variations in transmission efficiency between the optical paths may in general result in differences in the laser power levels at disks from the two opposing sides. Thus, what is needed is a method establishing different levels of laser beam attenuation as the laser beam is driven along different optical paths

DESCRIPTION OF THE PRIOR ART

U.S. Pat. No. 5,062,021, to Ranjan et al., describes a process in which magnetic recording media are controllably textured, particularly over areas designated for contact with data transducing heads. In conjunction with rigid disk media, the process includes polishing an aluminum nickel-phosphorous substrate to a specular finish, then rotating the disk while directing pulsed laser energy over a limited portion of the radius, thus forming an annular head contact band while leaving the remainder of the surface specular. The band is formed of multiple individual laser spots, each with a center depression surrounded by a substantially circular raised rim. The depth of the depressions and the height of the rims are controlled primarily by laser power and firing pulse duration. The shape of individual laser spots can be altered by varying the laser beam inclination relative to the disk surface. On a larger scale, the frequency of firing the laser, in combination with disk rotational speed controls the pattern or arrangement of laser spots. The smooth, rounded contours of the depressions and surrounding rims, as compared to the acicular character of mechanical textured surfaces, is a primary factor contributing to substantially increased durability of laser textured media.

U.S. Pat. No. 5,469,259 describes an interferometer of a common mode shearing type, which produces a pair of sheared optical beams both incident on a surface being inspected. These shared beams are produced by a compound Wollaston prism, which projects a real splitting point in the rear focal plane of a microscopic objective. The objective lens forms interferograms of portions of the surface being inspected on both an area array CCD sensor, used for static surface acquisition, and a line scan CCD sensor, used for moving surface acquisition as the test surface is moved, or scanned, past the objective lens. A dual-purpose illumination arm provides different forms of illumination required for the static (area) and moving (scanning) processes.

When the scanning process is to be performed, the interferometer is adjusted to produce a dark field interferogram on the line scan CCD sensor, with flat areas of the surface being scanned remaining dark, while anomalies, whether raised or depressed, appear as bright areas. Thus, while the scanning process is useful for determining the locations of anomalies, to a degree, their areas, many important features of an individual anomaly, such as whether it is raised or depressed and its height or depth cannot be determined.

On the other hand, when the interferometer of U.S. Pat. No. 5,469,259 is used in the static mode, analyzing a stationary interferometric image projected on the area array CCD sensor, the height or depth of the anomaly and various details of its shape can be readily determined. The disadvantage of this mode is that the surface under test must be held stationary as each anomaly is checked. Thus, a time to move between anomalies must be added to the time required for measurements and calculations, making the measurement of an individual anomaly take as long as 0.8 sec.

SUMMARY OF THE INVENTION

In accordance with one aspect of the invention, there is provided a device for generating a number of textured spots extending along surfaces of individual disks within first and second groups of disks. The device includes a texturing laser, a texturing laser, a beam directing mechanism, first and second drive mechanism, and a process control system. The texturing laser generates a texturing laser beam made up of a series of pulses. The beam directing mechanism, which directs the texturing laser beam, is movable between a first position, in which the laser beam is directed to a first exposure point, and a second portion, in which the laser beam is directed to a second exposure point. The first disk drive mechanism moves a disk within the first group of disks past the first exposure point, so that a part of a surface of the disk is exposed to the texturing laser beam with the beam directing mechanism in the first position. The second disk drive mechanism moves a disk within the second group of disks past the second exposure point, so that a part of a surface of the disk is exposed to the texturing laser beam with the beam directing mechanism in the second position. The process control system adjusts a first parameter controlling a characteristic of the texturing laser beam striking disks within the first and second groups of disks, with the first parameter being adjusted in accordance with a position of the beam directing mechanism.

BRIEF DESCRIPTION OF THE DRAWINGS

FIG. 1 is a schematic elevation of an interferometer system measuring textured spot profiles to provide data for the adjustment of laser texturing apparatus built in accordance with the present invention;

FIG. 2 is a schematic plan view of a half-wave plate in the interferometer of FIG. 1, taken as indicated by section lines II—II in FIG. 1 to show the polarization orientations of coherent beams travelling therethrough;

FIG. 3 is a schematic plan view of a Wollaston prism in the interferometer of FIG. 1, taken as indicated by section lines III—III in FIG. 1 to show the polarization orientations of laser beams travelling therethrough.

FIG. 5 is a graphical view of output produced by the system of FIG. 1 as an innermost textured spot is approached along a circular path;

DETAILED DESCRIPTION

Figure 4:
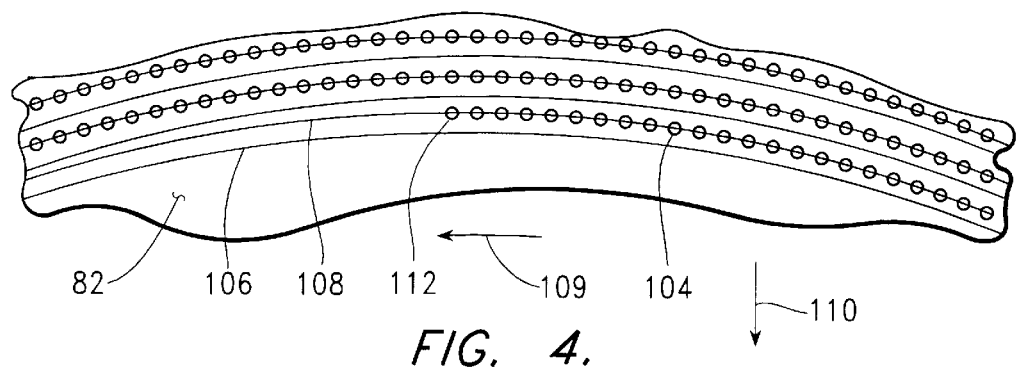
FIG. 4 is a fragmentary plan view of a disk which has been textured by means of a pulsed laser within laser texturing apparatus built in accordance with the present invention.

The present invention provides a feature within a laser texturing station for attenuating the power level of a laser beam, used to texture disks, according to the light path along which the laser beam is directed. For example, two light paths may be used in an alternating manner to direct a laser beam to disks provided by two disk handling stations. The present invention allows adjustment of the level of attenuation to compensate for differences in the transmission efficiency of one light path compared to another. This feature is most conveniently used to obtain a predetermined optimum profile for textured spots, with optical measurement apparatus being used to determine the profile of actual individual textured spots formed by the laser texturing station. Optical measurement apparatus external to the laser texturing station may be used to measure the textured spots on a completed textured disk, providing results used to set various parameters controlling the texturing process. Alternately, optical measurement apparatus may be employed within the laser texturing station, with the results of measurements being used to change texturing parameters on a real-time basis.

Optical measurement apparatus in the form of an interferometer system configured for application external to the laser texturing station will now be discussed, with particular references being made to FIGS. 1–5.

FIG. 1 is a schematic elevation of an interferometer system 10 configured to provide data for use in the adjustment of laser texturing apparatus built in accordance with the present invention. Within this interferometer system 10, a test surface 12 is illuminated from a beam 14 projected from a laser unit 16. A laser unit having an output beam with a wavelength of 532 nanometers has proven to be satisfactory in this application. This beam leaves the laser unit vertically polarized, as indicated by arrow 18. A half-wave plate 20 is rotated about the axis 22 of the laser beam 14 to provide a fine adjustment of the vertical polarization of the laser beam 14 projected therethrough. After passing through half-wave plate 20, a portion of the laser beam 22 is deflected downward, along an optical axis 24 of the interferometer 10, within a non-polarizing beamsplitter 25. A portion of the laser beam 14 is wasted, being transmitted through the beamsplitter 25 instead of reflected therein. The downward-directed reflected laser beam 26, which is horizontally polarized as indicated by arrow 28, is projected through a second half-wave plate 30.

FIG. 2 is a schematic plan view of the second half-wave plate 30, taken as indicated by section lines II—II in FIG. 1, to show the polarization orientations of laser beams projected therethrough. The transmission of linearly polarized light through a half-wave plate results in the rotation of the angle of polarization through an angle which is twice the angle between the direction of polarization and the crystal axis of the material composing the half-wave plate. In the example of half-wave plate 30, the crystal axis is at a 22.5 degree angle, indicated as angle A, from the polarization direction, indicated by arrow 28, of the downward-reflected beam 26 (shown in FIG. 1). Therefore, in passing through half-wave plate 30, the direction of polarization of this laser beam is rotated through a 45-degree angle, indicated as angle B, to have the orientation indicate by arrow 32.

FIG. 3 is a schematic plan view of a Wollaston prism 34, directly below the second half-wave plate 30, taken as indicated by section lines III—III in FIG. 1, to show the polarization of laser beams traveling through the upper portion of the prism 34.

Referring to FIGS. 1 and 3, the Wollaston prism 34 is composed of a pair of wedge-shaped segments 36, 38 of crystalline material having crystal axes 40, 42 which are perpendicular to one another and to the optical axis 24 of the interferometer 10. Thus, the downward deflected laser beam 26 enters the Wollaston prism 34 being polarized in a direction at a 45-degree angle from the optical axis of the upper wedge-shaped segments 36, and is therefore decomposed into a pair of sub-beams of equal intensity, polarized in the mutually-perpendicular directions indicated by arrows 28, 44. Since the crystalline material forming each segment 36, 38 of the Wollaston prism 34 is birefringent, refracting beams polarized at different angles in different directions, the two sub-beams travelling downward therethrough, being polarized perpendicularly to one another, as indicated by arrows 28, 44, are refracted differently at the interface 46 between the segments 36, 38. In general, the Wollaston prism separates the two sub-beams exiting its lower surface by a deviation angle, which is a function of the wavelength of the laser beam, the indices of refraction of the materials of which the wedge-shaped portions 36, 38, and the angle at which the interface surface 46 is sloped.

In general, a Wollaston prism may be composed of a number of wedge-shaped segments, from a single segment up to three or more segments. In a Wollaston prism having one or two segments, the sub-beams diverge from a surface, such as interface surface 46, which is called a split point. In a Wollaston prism having three or more segments, the sub-beams are typically brought back together, to cross one another at a cross-over point between the Wollaston prism and the objective lens. If there is no cross-over point, the split point is in the back focal plane of the objective lens. If there is a cross-over point, the final cross-over point is in the back focal plane of the objective lens.

In this way, a right sub-beam 48 having a first direction of polarization and a left sub-beam 50, having a direction of polarization perpendicular to that of right sub-beam 48 are formed. Both of these sub-beams 48, 50 pass through an objective lens 52, being focussed on test surface spots 54, 56, respectively. After reflecting off the test surface spots 54, 56 the sub-beams 48, 50 return upward through objective lens 52 and Wollaston prism 34, being recombined at the upper wedged-shaped segment 36 of the prism 34. During the process of reflection off the spots 54, 56, the directions of polarization remain as indicated by arrows 28, 44.

In the example of FIG. 1, test surface spot 54 is raised above the level of test surface spot 56. Since the distances travelled by the sub-beams 48, 50 are different, the times required for projection and reflection from the test spots 54, 56, respectively, are different, producing a phase-shift between the two sub-beams 48, 50 as they are reflected back to the Wollaston prism 34. When these reflected sub-beams are recomposed within the Wollaston prism 34, due to this phase shift, they form an elliptically polarized beam, having major and minor axes extending at 45-degree angles to the crystal axes 40, 42 of the materials making up the Wollaston prism 34. In FIG. 3, the polarization of this recomposed beam is indicated by an ellipse 58.

Referring to FIGS. 2 and 3, as the recomposed beam is transmitted upward through half-wave plate 30, its elliptical polarization is rotated to have major and minor axes extending in the direction of arrow 28 and in the direction perpendicular thereto, as indicated by an ellipse 60. The relative intensities along the major and minor axes of ellipse 60 are determined by the phase-shift between the sub-beams 48, 50 returning after reflection from the test spots 54, 56.

Referring again to FIG. 1, the recomposed beam is transmitted upward front half-wave plate 30 into the non-polarizing beamsplitter 25, with the transmitted portion 62 of this recombined beam being used for subsequent measurements, as the portion of this beam reflected within the beamsplitter 25 is discarded. The elliptical polarization indicated by ellipse 60 in FIG. 2 is retained. The transmitted portion 62 of this beam is next split within a polarizing beamsplitter 64, with a portion of the beam 62 polarized in the direction indicated by arrow 28 being transmitted into a first photodetector 66, while a portion of the beam 62 polarized in the direction of arrow 44 (shown in FIG. 3) is reflected into a second photodetector 68.

The output of each photodetector 66, 68 is provided as an input to a corresponding analog to digital convertor 70, which in turn provides an input to a computer processor 72. This processor 72 is a conventional device connected to conventional devices, such as a system memory 74, a hardfile 76, and a display unit 78. Programs for execution within the processor 72 are loaded into memory 74 from a diskette 80.

Referring to FIGS. 1–3, the relative illumination intensities measured at photodetectors 66, 68 provide an indication of relative intensities of the polarization along the major and minor axes of the elliptical polarization indicated by ellipse 60, and hence of the phase shift between the returning sub-beams 48, 50. This phase shift is a function of the relative heights of test spots 54, 56 and of parameters within the interferometer 10. The elliptically polarized return beam exiting half-wave plate 30 may be mathematically broken into an X-vector, $V_x$, describing light polarized in the direction indicated by arrow 28, and a Y-vector, $V_y$, describing light polarized in the direction indicated by arrow 44. The values of these vectors are given as a function of the time variable, t, by:

$$V_x = A_0 \sin(\omega t + kL + 2kd + \phi_0) \quad (1)$$

$$V_y = A_0 \sin(\omega t + kL) \quad (2)$$

Thus, the X- and Y-vectors have the same amplitude, $A_0$, differing only in phase angle. In these equations, $\omega$ is the angular frequency of the laser beam, in radians per second, L is the original length of the light path, which does not matter because it has the same effect on both equations (1) and (2), d is the height difference which is being measured by this process, $\phi_0$ is an original phase angle, which is the phase angle provided by the apparatus when the test spots 54, 56 are at the same height, and k is a wave number, which is defined as follows:

$$k = \frac{2\pi}{\lambda} \quad (3)$$

In this expression, $\lambda$ is the wavelength of the laser beam. To simplify the following mathematical derivation, these equations are rewritten using complex notation as:

$$V_x = A_0 e^{i(\omega t + kL + 2kd + \phi_0)} \quad (4)$$

$$V_y = A_0 e^{i(\omega t + kL)} \quad (5)$$

After passing through the beamsplitter 25, the elliptically polarized return beam 62 is broken into sub-beams within polarizing beamsplitter 64. Since the beamsplitter 25, being a non-polarizing type, handles differing polarities in the same way, losses in the transmission through this beamsplitter 25 are not considered, as it is determined that the light level at photodetector 68 is given by:

$$V_s = V_x \cos 45° + V_y \cos 45° \quad (6)$$

$$V_s = \frac{\sqrt{2}}{2} A_0 [e^{i(\omega t + kL + 2kd + \phi_0)} + e^{i(\omega t + kL)}] \quad (7)$$

Similarly, the light level at photodetector 66 is given by:

$$V_p = \frac{\sqrt{2}}{2} A_0 [e^{i(\omega t + kL + 2kd + \phi_0)} - e^{i(\omega t + kL)}] \quad (8)$$

The light intensity measured at photodetector 68 is obtained by multiplying $V_s$ times its conjugate, resulting in the following equation:

$$I_1 = \frac{A_0^2}{2} [e^{i(\omega t + kL + 2kd + \phi_0)} + e^{i(\omega t + kL)}] \\ [e^{-i(\omega t + kL + 2kd + \phi_0)} + e^{-i(\omega t + kL)}] \quad (9)$$

Next, $I_0$ is defined as equal to the square of $A_0$, the imaginary portion of the above equation is eliminated, and the real portion of the equation is rewritten as:

$$I_1 = \frac{I_0}{2} [2 + \cos(2kd + \phi_0)] \quad (10)$$

$$I_1 = I_0 \cos^2\left(kc + \frac{\phi_0}{2}\right) \quad (11)$$

Similarly the beam intensity at sensor 66 is given by:

$$I_2 = I_0 \sin^2\left(kd + \frac{\phi_0}{2}\right) \quad (12)$$

The preceding discussion assumes that the incoming laser beam 14, which is directed downward at the half-wave plate 30, is perfectly polarized in the direction of arrow 28 when it enters the half-wave plate 30. In other words, the preceding discussion assumes the following equations to be true:

$$I_x = I_0 \quad (13);$$

$$I_y = 0 \quad (14)$$

A more realistic mathematical model is given by the following equations, in which $\Gamma$ has a value, depending on various aspects of the apparatus, between 0 and 1. If the input beam from the laser entering half-wave plate 30 is entirely polarized in the x-direction indicated by arrow 28, $\Gamma$ is equal to one. If this beam is entirely polarized in the y-direction indicated by arrow 44 (shown in FIG. 3), $\Gamma$ is equal to zero.

$$I_x = \Gamma I_0 \quad (15)$$

$$I_y = (1-\Gamma)I_0 \quad (16)$$

Under these conditions, the illumination intensity, $I_1$, of the beam impinging on photodetector 68, and the illumination intensity, $I_2$, of the beam impinging on photodetector 66, are given by the following equations:

$$I_1 = \Gamma I_0 \cos^2\left(kd + \frac{\phi_0}{2}\right) + (1-\Gamma)I_0 \sin^2\left(kd + \frac{\phi_0}{2}\right) \quad (17)$$

$$I_2 = \Gamma I_0 \sin^2\left(kd + \frac{\phi_0}{2}\right) + (1-\Gamma)I_0 \cos^2\left(kd + \frac{\phi_0}{2}\right) \quad (18)$$

The mathematics associated with these intensities is simplified by considering the sum and differences of Equations (17) and (18), yielding the following results:

$$I_1 - I_2 = (2\Gamma - 1)I_0 \cos(2kd + \phi_0) \quad (19)$$

$$I_1 + I_2 = I_0 \quad (20)$$

A differential intensity parameter is formed by dividing the difference between the illumination intensity signals by their sum. Thus, this differential intensity parameter S is given by the following equation:

$$S = \frac{I_1 - I_2}{I_1 + I_2} = (2\Gamma - 1)\cos(2kd + \phi_0) \quad (21)$$

The interferometer 10 can be adjusted, particularly by moving the Wollaston prism 34 in the directions indicated by arrow 28, so that $\phi_0$ is equal to 0, $\pi/2$, or another convenient value. Such an adjustment may, for example, be made so that, when a flat test surface 12 is imaged, the output values of the two photodetectors 66, 68 are equal.

Next $\phi_0$ is set to $-\pi/2$, so that S is expressed as:

$$S = (2\Gamma - 1)\sin 2kd = (2\Gamma - 1)\sin\left(\frac{4\pi d}{\lambda}\right) \quad (22)$$

With this substitution, S has the same sign as d. Equation (22) is in a form which can be solved for the distance d, yielding:

$$d = \left(\frac{\lambda}{4\pi}\right)\arcsin\left(\frac{S}{2\Gamma - 1}\right) \quad (23)$$

This equation holds true as long as the following relationships are met:

$$0 < \Gamma < 1 \quad (24);$$

$$\Gamma \approx \frac{1}{2} \quad (25)$$

Thus, during measurement processes, a program is executed in processor 72 to determine the difference in height between the two test spots 54, 56, indicated as d in the equations, by substituting the illumination intensity values, indicated in the equations as $I_1$ and $I_2$ in the equations, measured by photodetectors 66, 68, into the equations (22) and (23).

These measurements and calculations are preferably made as the test surface 12 is driven in a scanning direction. In the example of FIG. 1, the test surface 12 is an upper surface of a disk 82 being examined. The disk 82 is mounted atop a turntable 84, which is mounted to rotate on a carriage 86 about a shaft 88. The carriage 86 is in turn mounted to slide on a pair of parallel guide shafts 90, being driven by a leadscrew 92, engaging an internally threaded block portion 94 of the carriage 86. The leadscrew 92 is driven by a motor 96. Rotary motion of the turntable 84 is achieved using a second motor 98 driving a wheel 100 engaging an outer surface of the turntable 84. The motors 96, 98 are driven to scan the surface 82 past the projected sub-beams according to a pre-determined path by means of driver circuits 102 in response to a program routine executing in processor 72. Since, during scanning, the output levels of photodetectors 66, 68 may continuously change, these outputs are preferably examined by sampling on a periodic basis. This sampling process may obtain an instant level of intensity measurement or an average intensity level occurring over a short time, such as the time between samples.

FIG. 4 is a fragmentary plan view of a magnetic disk 82 which has been textured by means of a pulsed laser, forming a number of textured spots 104.

Referring to FIGS. 1 and 4, as the disk 82 is inspected using the interferometer 10, the radially inward test spot 54 follows an inner path 106, while the radially outward test spot 56 follows an outer path 108, with the test spots actually remaining stationary while the disk turns in the direction of arrow 109 and translates in the direction of arrow 110. These paths 106, 108 are configured to assure that the inner test spot 54 remains on the flat untextured portion of the disk 88 while the outer test spot 56 goes directly through each textured spot 104. In the example of FIG. 4, the pattern of textured spots 104 spirals radially outward from a first, innermost textured spot 112.

In general, a strategy is needed to align the paths 106, 108 with the pattern of textured spots 104. If the radial location of the first textured spot 112 is known with sufficient precision, it is only necessary to spin the disk 82 with outer test spot 54 at this radius. Then, when the first textured spot 110 is detected, leadscrew motor 95 is started to begin the radially outward movement of the test spots 54, 56 along the pattern of textured spots 104, at a predetermined spiral angle, as the spinning movement of the disk 82 is continued. Since the manufacturing process which formed these textured spots 104 is known, the necessary spiral angle can easily be determined.

On the other hand, if the radial location of the first textured spot 112 is not known with sufficient precision, this location is found by starting with the outer test spot 56 at a radius inward from the innermost expected location of the first textured spot 112. The test spots 54, 56 are then moved radially outward in a number of small, incremental radial movements as the disk 82 is spun.

FIG. 5 is a graphical view of the output produced by processor 72 as the outer test spot 56 (shown in FIG. 1) is held at the radius of the first textured spot 112 (shown in FIG. 4). The upper curve 114 represents the output occurring when each textured spot is a simple, depressed crater. The lower curve 116 represents the output occurring when each textured spot includes a surrounding ridge and an upward-extending central portion. In either case, the curve includes an indication 118, 120 of the first textured spot 112, followed by a number of attenuated indications 122, 124 of following textured spots 104. These indications 122, 124 occur as the circular path of outer test spot 56 diverges inward from the spiral path of the pattern of textured spots 104. In the case generating upper curve 114, to determine the radial location of the first textured spot 112, processor 72 tracks the depth of the central portion 118; when this depth is maximized, movement of the test points 54, 56 along the spiral angle is begun. In the case generating lower curve 116, processor 72 tracks the level of upward extension of the central feature within the textured spot 104. Similarly, when this height is maximized, movement of the test points 54, 56 along the spiral angle is begun.

Figure 6:
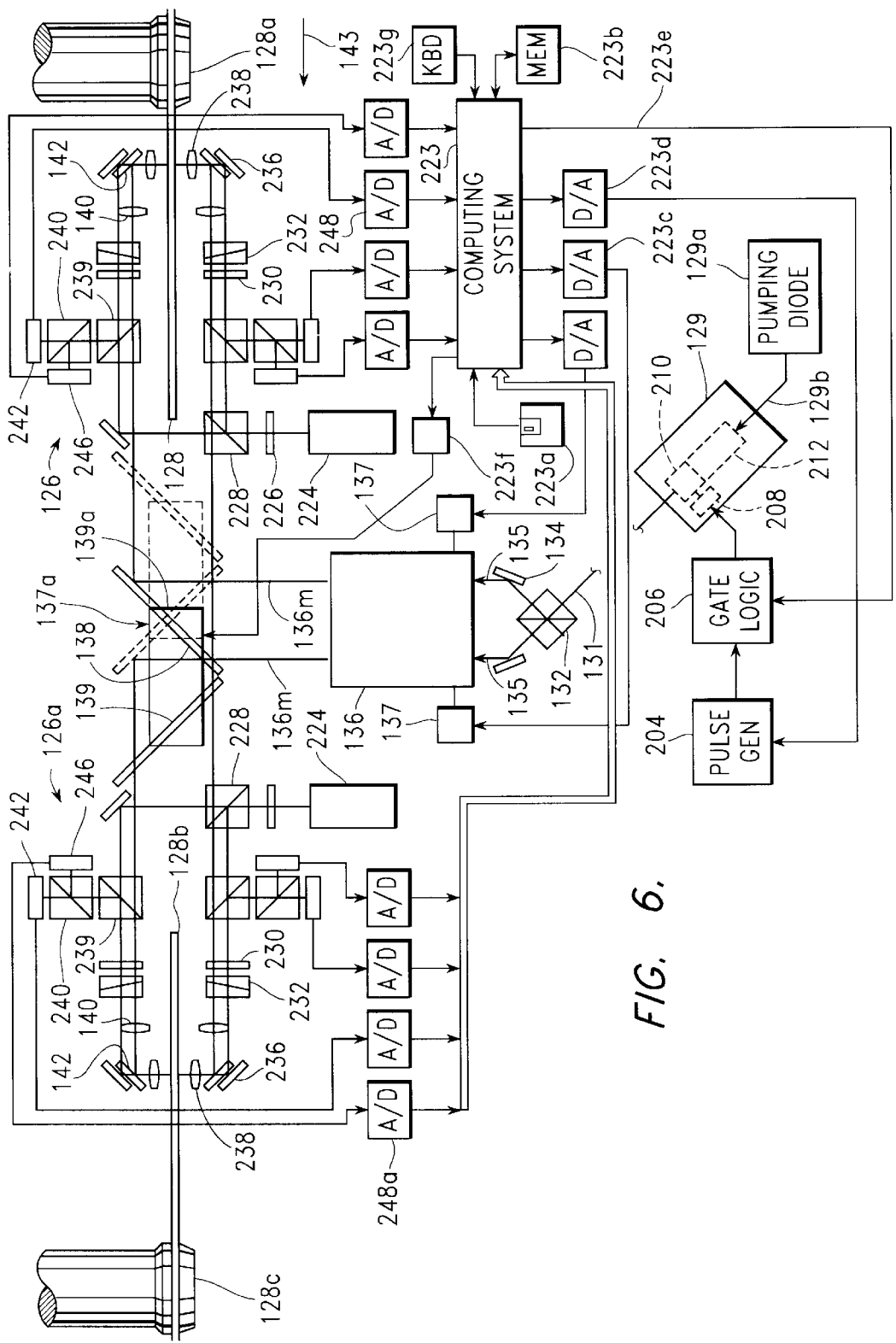
FIG. 6 is a schematic plan view of laser texturing apparatus built in accordance with the present invention.

FIG. 6 is a schematic plan view of laser texturing apparatus built in accordance with the present invention. In the embodiment of FIG. 6, a pair of interferometers 126, 126a are included as portions of a device for laser texturing magnetic disks. This embodiment has the advantages of not requiring the operations described above in reference to FIGS. 4 and 5 to locate the pattern of textured spots 104 (shown in FIG. 4). Since the interferometer is part of the device forming the textured spots, and since a disk 128 being textured is simultaneously moved past both the laser beam 136m causing texturing and the interferometer, the location of textured spots is always known with great accuracy. Furthermore, the interferometer 126 and associated electronics generate signals which may be used in a real-time basis, as part of a feedback system to make corrections to various parameters controlling the texturing process. Nevertheless, the internal interferometers 126, 126a are considered optional means for implementing the present invention, since the interferometer system described above in reference to FIGS. 1–5 may be used to obtain profile data from textured disks to facilitate adjusting parameters of the texturing process.

In the apparatus of FIG. 6, texturing is performed using a pulsed laser 129, which directs a laser beam 131 to a non-polarizing beamsplitter cube 132, which splits the beam into two beams 135 that are equal in intensity within five percent. These two beams 135 are directed, by means of a pair of steering mirrors 134, toward opposite sides of the disk 128 being carried through the texturing process by spindle assembly 128a. After reflection off these steering mirrors 134, the laser beams travel as a pair of parallel beams 135, separated by a distance of 25 mm, to enter a power control optics block 136, in which the intensity of the two beams is balanced by controlling the voltage applied to liquid-crystal variable retarders. In this way the intensity of the parallel laser beams leaving the power control optics block 136 is made equal within one percent.

Figure 7:
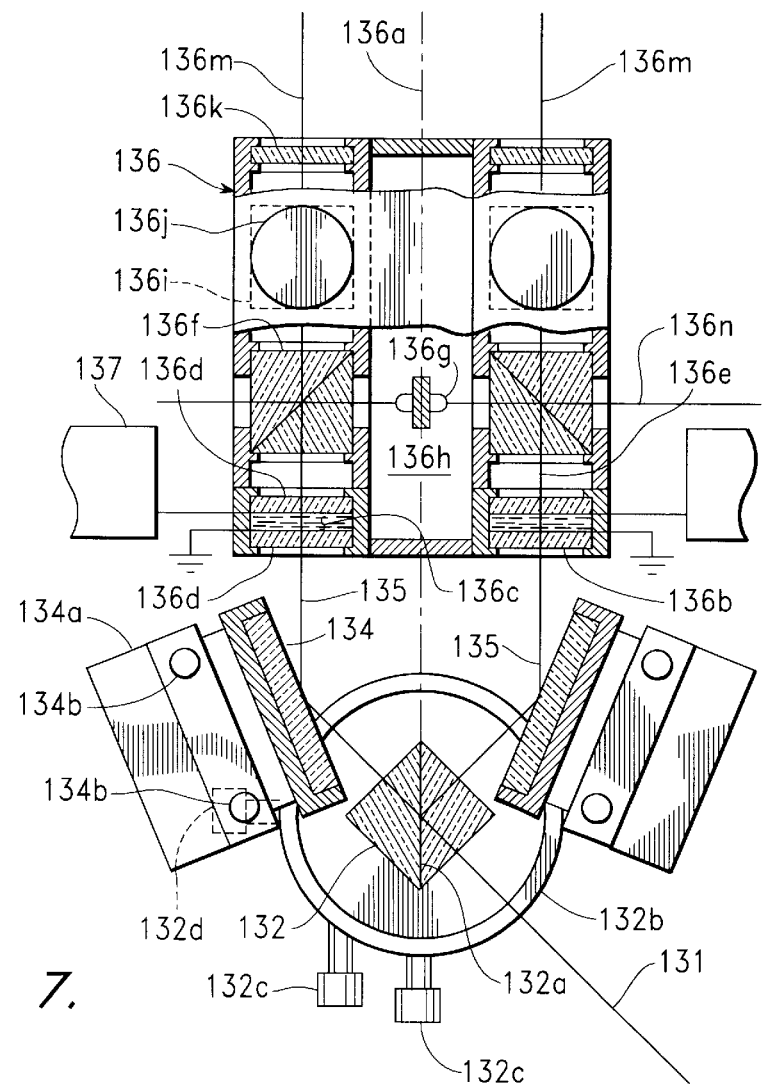
FIG. 7 is a sectional plan view of a power control optics block in the apparatus of FIG. 6.

FIG. 7 is a partially sectional plan view of the beamsplitter cube 132, together with steering mirrors 134 and the power control optics block 136. The two laser beams 135 forming inputs to the block 136 extend parallel to, and equally offset from, an axis 136a of the power control optics block 136, about which the various elements of this block 136 are symmetrically deployed. Symmetrical beams 135 result from the fact that the input beam 131 to the beamsplitter cube 132 is directed at a 45-degree angle with respect to the optics block axis 136a, with the reflective surface 132a within the beamsplitter cube being aligned along the optics block axis 136a. Each of the steering mirrors 134 is aligned to be struck by an associated beam from the beamsplitter cube 132 at an angle of incidence of 67.5 degrees.

Adjustments for bringing the separate laser beams 135 into a parallel condition, and for otherwise aligning them, are provided by several manually turned knobs. Beamsplitter cube 132 is mounted on a rotary stage 132b, with a pair of knobs 132c tilting the cube 132 about orthogonal axes, and with a knob 132d providing for the rotation of the cube 132. For example, a rotary stage suitable for this application is supplied by the Newport Corporation of Irvine, Calif., under their part number PO32N. Each steering mirror 134 is mounted by an adjustable mirror mount 134a, which includes a pair of knobs 134b used to tilt the associated mirror 134 about mutually perpendicular axes. Mirror mounts suitable for this application are supplied, for example by the Ealing Electro Optics, Inc. Holliston, Mass., under their catalog number 37-4777.

Within the power control optics block 136, the power of the two beams 135 from beamsplitter cube 132 is balanced, so that these beams have power levels within one percent of one another. The beamsplitter cube 132 splits the single beam arriving from the laser into a pair of beams 135 having power levels within five percent of one another. While the beamsplitter cube 132 is a non-polarizing device, the laser beams 135 entering the power control optics block 136 are nominally, or predominately, s-polarized, having passed through polarizing beamsplitter 118 (shown in FIG. 5).

Within the power control optics block 136, each of these beams 135 first enters a liquid crystal variable retarder 136b. Each of these retarders 136b includes a cavity 136c formed between a pair of fused silica windows 136d spaced a few microns apart. The interior surface of each window 136d has a transparent conductive indium tin oxide coating. The cavity 136c is filled with birefringent nematic liquid crystal material with molecules that tip according to a voltage applied between the transparent conductive coatings of the windows 136c. The angle of polarization of the laser beam 135 entering each retarder 136b is changed according to the voltage applied across the cavity 136c by means of the coatings on windows 136d. Thus, the s-polarization of each beam 135 entering a retarder 136b is altered, in a continuously variable manner, toward a p-polarization of the beam 136e leaving the retarder 136b. A suitable liquid crystal variable retarder may be obtained, for example, from Meadowlark Optics, of Longmont, Colo., under their part number LVR-100-1047-V.

The voltage signal driving each liquid crystal variable retarder 136b is provided by the output of a function generator 137, which preferably produces a DC-balanced 2 kHz square wave having an amplitude which is adjustable to determine how the polarization of the beam passing through the retarder 136b is altered.

After exiting the retarder 136b, each beam 136e enters a polarizing beamsplitter 136f, which reflects s-polarized power inward to a beam dump 136g to be dissipated within a cavity 136h, while transmitting p-polarized energy to an non-polarizing beamsplitter 136i. Each non-polarizing beamsplitter 136i reflects about one percent of the energy incident upon it upward, providing the input to a power detector 136j. The remaining energy is transmitted through a quarter-wave plate 136k, which converts the p-polarized energy incident upon it into a circularly-polarized beam 136m exiting the power control optics block 136.

The combination of a retarder 136b with a polarizing beamsplitter 136f provides a convenient way to control the power level of each beam 136m exiting the block 136, while the combination of a non-polarizing beamsplitter 136i with a power detector 136j provides a convenient means for measuring this power level. The output signals from power detectors 130, 136j are individually calibrated using measurements of beams 136m at the exit of the power control optics block, or farther along the optical path toward the point at which a disk 49 is textured. This type of calibration is generally needed because of a number of factors, such as differences in the percentage of incident power reflected within the beamsplitters 136i aiming beams at these power detectors. The outputs of power detectors 130, 136j are preferably displayed externally on the laser texturing tool 37 (shown in FIG. 4).

A method for manually setting-up or readjusting the various laser power levels includes the steps of monitoring the outputs of power detector 130 and making corresponding adjustments to a signal driving the laser 108. The two beams 136m are balanced by observing the outputs of both power detectors 136j with both retarders 136b set to transmit maximum levels of p-polarized power, and by reducing the level of p-polarized power transmitted by the retarder corresponding to the higher power level read by one of the power detectors 136j, until these two detectors indicate the same power level, with calibration factors being considered. As the level of p-polarized power is decreased in either of the beams, the level of power present in the corresponding output beam 136m is decreased, as the increased s-polarized power is rejected inward by the polarizing beam splitter 136f. In this way, the output levels of the two beams are balanced by attenuating the beam initially having the higher level.

While the method described above is useful in performing an initial set-up adjustment, particularly to overcome the effects of an uneven split of the power in laser beam 131 into two beams 135, it is further desirable to perform adjustments based on the actual profiles of textured spots produced on disks processed through the apparatus.

The laser texturing apparatus of FIG. 6 is configured to texture either a disk 128 spinning with right spindle assembly 128a or a disk 128b spinning with left spindle assembly 128c. While these two disks 128, 128b cannot be textured simultaneously, they are preferably textured in an alternating manner, with a disk from one side being textured as a disk from the other side is brought into place. This method provides a number of advantages related to the throughput of the texturing device, its flexibility of usage, and its reliability of operation. A discussion of right and left disk handling stations alternately providing disks to the laser station for texturing in this way is found in the co-pending U.S. application Ser. No. 08/613,564, now U.S. Pat. No. 5,658, 475 described above in a cross-reference to a related application.

The parallel laser beams 136m from power control optics block 136 are directed toward either disk 128 or 128b according to the position of a shuttling mirror assembly 137a, which includes a rightward-beam-directing mirror 138 and a leftward-beam-directing mirror 139. When this shuttling mirror assembly 137a is in the position indicated in FIG. 6 by solid lines, the rightward-beam-directing mirror 138 reflects the laser beams 136m to texture the disk 128 turning with right spindle assembly 128a. When the shuttling mirror assembly 137a is in the position indicated in FIG. 6 by dashed lines, the leftward-beam-directing mirror 139 reflects the laser beams 136m to texture the disk 128b turning with left spindle assembly 128c. The shuttling mirror assembly 137a is moved between these two positions by a slider 139a, which, for example, may be a pneumatic device controlled by solenoid valves (not shown). Thus, disks turning with the two spindles 128a and 128c are alternately textured as the laser beams 136m are directed along separate light paths. From each shuttling mirror 138, 139, the texturing beams 136m are directed through focussing lenses 140 and off reflective surfaces 142 to strike opposite sides of an associated disk 128, 128b.

The disk 128 to be textured is held in right spindle 128a while it is rotated by a right spindle drive motor (not shown). A right spindle translation motor (also not shown) moves the entire right spindle assembly 128a, first in the direction indicated by arrow 143, and then in the direction opposite that of arrow 143. The texturing process occurs during this return motion, opposite the direction of arrow 143. Similarly, the disk 128b to be textured is held in left spindle 128c, which is rotated by a left spindle drive motor (also not shown). A left spindle translation motor (also not shown) moves the left spindle assembly 128c, first in the direction opposite that of arrow 143, then in the direction of arrow 143, with the texturing process occurring during the return motion in the direction of arrow 143. The motion of each spindle assembly 128a, 128c is tracked by an encoder (not shown) moving adjacent to an encoder scale (also not shown).

For example, the laser 129 is energized by diode pumping from a laser diode 129a through a fiber-optic cable 129b, and is pulsed by a Q-switch control including a pulse generator 204 to generate a square wave corresponding to the desired train of laser beam pulses, and gate logic 206 to determine when laser beam pulses occur. The laser 129 includes an oscillator 208 driving an acousto-optic Q-switch 210, within a laser cavity 212 in the laser 129, with a radio-frequency signal. When the Q-switch 210 is acoustically activated by this radio-frequency signal, it spoils the Q-factor of the laser cavity 212, stopping the emission of a laser beam. When the radio-frequency energy is turned off for a relatively short time, the laser is permitted to emit a laser beam pulse. In a typical production mode of the laser texturing apparatus of FIG. 6, the frequency of pulse generator 204 is set at 10 KHz, producing a pulse every 100 microseconds, while the oscillator 208 produces a radio-frequency wave at 80 MHz.

The level of power which may be delivered from pumping diode 129a depends on the type of laser 129 employed within the system. For example, one type of laser 129 uses up to 2 watts of power from pumping diode 129a, while another type of laser 129 uses as much as 20 watts. Furthermore, the use of a different laser configuration suggests the use of different frequencies, with the pulse generator 204 operating, for example, at 70 KHz.

In the context of the disk texturing process described herein, it is particularly desirable to be able to vary the shape of each laser beam pulse within a train of such pulses. For example, a longer pulse width (or greater pulse duration) tends to produce a higher rim around the textured area as indicated by the lower curve 116 of FIG. 5, together with a lower central area. However, if the conventional means of varying the repetition rate (i.e. the frequency of the square wave pulses from pulse generator 204) is used, any attempt to change the wave shape also results in a change in the time between pulses, and, therefore, in a variation in the distance between textured spots on the disk. An attempt to correct this may result in further changes to spot size and in an unsatisfactory variation in the time required to complete the process of texturing a single disk. To overcome such difficulties, pulse generator 204 is configured to have a variable duty cycle.

Figure 8:
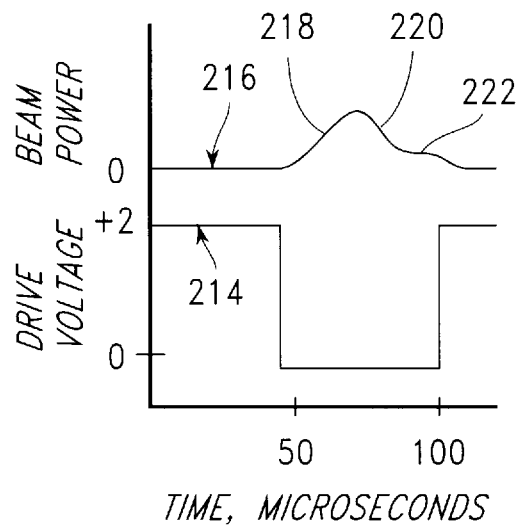
FIG. 8 is a graphical view of a texturing laser pulse obtained with a pulse generator duty cycle of 45 percent.
Figure 9:
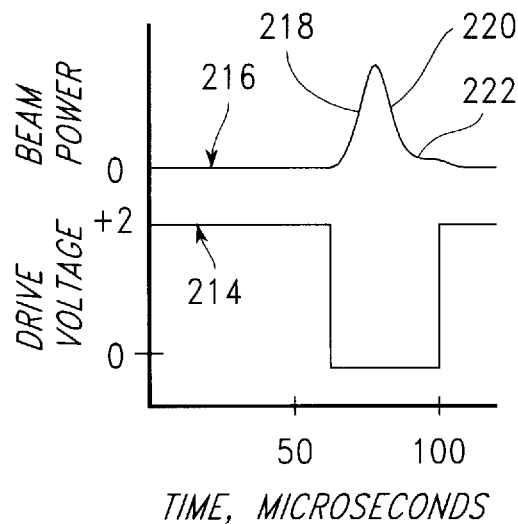
FIG. 9 is a graphical view of a texturing laser pulse obtained with a pulse generator duty cycle of 60 percent.
Figure 10:
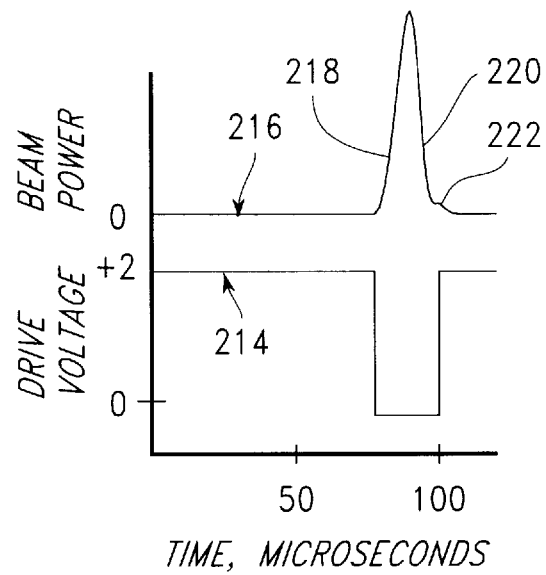
FIG. 10 is a graphical view of a texturing laser pulse obtained with a pulse generator duty cycle of 75 percent.

FIGS. 8–10 are graphical views showing the effects of variations in the duty cycle of the signal driving the oscillator 208 on the shape of the laser pulse emitted. In each of these FIGS., a lower curve 214 represents a drive voltage applied from the pulse generator 204, through gate logic 206, as an input to oscillator 208. In the example of these FIGS. 8–10, when two volts is applied in this way, the oscillator 208 drives Q-switch 210 with radio-frequency energy, preventing the emission of a laser beam pulse, as shown in the upper laser beam power curve 216. Each FIGS. 8–10 shows a 100-microsecond single pulse in a train of pulses generated at 10 KHz. In FIG. 8, the duty cycle (the ratio of time Q-switch 210 is driven with a radio-frequency signal divided by the total time of a cycle) is 45 percent. In FIG. 9, the duty cycle is 60 percent. In FIG. 10, the duty cycle is 75 percent.

In each FIGS. 8–10, when the drive voltage is dropped, the laser output power rises rapidly along an initial curve portion 218 to a maximum level, and then falls along a second curve portion 220 to a much lower level at third curve portion 222, which continues until the drive voltage is restored. During the portion of each cycle preceding the laser pulse, energy is accumulated, with more energy being accumulated as a longer time is allowed for this purpose. Both the steepness of the subsequent rise in laser output power and the level to which this power rises are increased with the increased stored energy of pulses having higher duty cycles.

Thus, through the use of a pulse generator 204 having a variable duty cycle, an ability is gained to change the height and width of individual laser beam pulses, without changing the repetition rate of such pulses. This feature is especially useful in a texturing system used to texture disks formed with different materials or to texture disks according to multiple requirements.

Referring again to FIG. 6, the control of various texturing parameters is achieved through the use of a computing system 223, which includes a provision for reading program information stored on disks 223a and a memory 223b. The memory 223b may include, for example, random access system memory and hardfile storage. The outputs of the computing system 223 are used to drive various systems to establish operating conditions for the texturing process. For example, an input signal to each function generator 137, which controls the level at which a corresponding input beam 135 is attenuated within the power control optics block 136, is sent from the computing system 123 through a digital-to-analog convertor 223c. An input signal to the pulse generator 204, controlling the duty cycle of this generator 204 to effect changes in the shape of the laser beam pulses from texturing laser 129 is sent from the computing system 123 through a digital-to-analog convertor 223d. The computing system 223 also performs various sequencing functions, with an output signal on line 223e to gate logic 206 being used to turn the pulses from texturing laser 129 on through Q-switch 210 only when they are needed for texturing, and with an output signal to a solenoid valve 223ƒ being used to control the position of shuttling mirror assembly 137*a* through pneumatic slider 139*a*.

Of the exemplary parameters controlled in this way, the pulse shape is applied simultaneously to whichever disk 128 or 128*b* is being textured at a time. However, a different pulse shape may be applied to the disks 128 and 128*b* from opposite sides of the laser station. This kind of flexibility is particularly desirable in the event that different types of disks are to be textured on the two spindles 128*a*, 128*c*, or if disks from these spindles are otherwise to be textured according to differing specifications. In certain instances, the ability to texture disks according to differing specifications allows the laser texturing process to be used at a full rate of production when a limited number of disks textured to one of the specifications is required.

On the other hand, the laser power parameter is independently applied to each side of the disk 128 or 128*b* being textured, providing a type of control which is particularly important because of differences between the two beams 135 arising from beam splitter 132 at the beginning of the different optical paths extending to the sides of the disk being textured. This independence of control of the laser power attenuation arises from the fact that the liquid crystal variable retarders 136*b* (shown in FIG. 7) within power control optics block 137 are independently driven by a pair of function generators 137 receiving input signals from computing system 223 through digital-to-analog converters 223*c*. Furthermore, these function generators 137 are preferably driven at independently adjustable levels according to the spindle 128*a* or 128*c* holding the disk currently being textured. This type of independent adjustment provides compensation for differences in the efficiency of transmitting laser beams along the optical paths leading to the disks on the different spindles 128*a*, 128*c*. This type of independent adjustment can also be used to facilitate texturing disks to differing specifications on the two spindles.

Thus, the computing system 223 stores, within memory 223*b*, independent levels for one or more parameters to be applied to disks being textured on the spindles 128*a* and 128*b*. Since the computing system 223 controls the position of shuttling mirror assembly 137*a* through solenoid valve assembly 223*f*, the location of the shuttling mirror is known within the system 223. This information is used to determine which of the two levels for each parameter to apply for the texturing of an individual disk.

In a first version of the present invention, which does not the internal interferometers 126, 126*a*, the various parameter levels stored within memory 223*b* are provided as inputs by the operator, using, for example, a keyboard 223*g* attached to the computing system 223. Beyond initial settings, these inputs are preferably based on attempts to bring various parameters measured along actual textured spots to predetermined optimum levels. The interferometric device previously described in reference to FIGS. 1–5 is particularly useful in measuring actual textured spots for this process. Such measurements are made along each of the two sides of a disk 128 textured on right spindle assembly 128*a* and a disk 128*b* textured on left spindle assembly 128*c*.

Continuing to refer to FIG. 6, a second version of the present invention includes a pair of interferometers 126, 126*a* built into the laser texturing apparatus. Each interferometer 126, 126*a* is similar to the interferometer 10 described above in reference to FIG. 1, except for the rearrangement of components to provide for the simultaneous inspection of both sides of the disk 128 and to allow the device to fit within the apparatus. Thus, a laser 224 directs a polarized beam through a half-wave plate 226, which refines and adjusts its angle of polarization, to a non-polarizing beam splitter 228, which directs half of the beam energy along each side of the disk 128. As before, the remaining portions of each light path include a second half-wave plate 230 a Wollaston prism 232, and an objective lens 238. A reflector 236 is added to direct the sub-beams from the prism 232 toward the disk 128. The returning sub-beams, having been reflected off the surface of disk 128, are recombined in the Wollaston prism 232, and are reflected by means of a non-polarizing beamsplitter 239 and a polarizing beam splitter 240 into a pair of photodetectors 242, 246. The output of each photodetector 242, 246 within right interferometer 126 is fed through an analog-to-digital convertor 248 into a computing system 250. Similarly, the output of each photodetector 242, 246 within left interferometer 126*a* is fed into the computing system 223 through an analog to digital convertor 248*a*. In the computing system 223, a program performing the calculations described above in reference to FIG. 1 is running. This program has been loaded into the computing system 223 by means of one or more diskettes 223*a*, on which the program is magnetically recorded. These calculations develop a profile of each textured spot, on each side of each of the disks 128, 128*a*.

In general, to generate data describing the entire texturing process, the computing system 223 tracks four separate texturing profiles, one for each of the two sides of the disks 128 being textured on right spindle assembly 128*a* and one for each of the two sides of the disks being textured on left spindle assembly 128*c*. To facilitate these calculations, the computing system 223 may be operated in a multitasking mode. However, since the disks on spindle assemblies 128*a*, 128*c* are textured in an alternating fashion, the calculations performed with profile data from these disks are also performed in alternating fashion, reducing the processing load placed on the computing system 223.

The interferometers 126, 126*a* are preferably mounted adjacently above or below the paths of texturing beam 136*m*, depending on the direction of rotation of rotation of disk 128, so that individual textured spots are inspected soon after they are formed.

Data collected this way may be displayed on a conventional display unit (not shown), providing inputs to a process in which calculations are made as described above for adjusting one or more parameters in the texturing process. Separate data is used for each side of each disk.

However, in a preferred version of this invention, this data is used to control various parameters of the texturing process on a real-time basis. For example, if a ridge is being formed around each textured spot 104 (shown in FIG. 4), and if the height of this ridge is controlled by varying the duration of each laser pulse, the ridge heights measured by the interferometers 126 is, for example, averaged, and the ideal ridge height is approached by varying an output from computing system through a digital-to-analog convertor 223*d* to control the duty cycle of pulse generator 204. Another output from computing system 223 to gate logic 206, on line 223*e*, is used to turn the laser pulses on only when they are needed for the texturing process. If the overall depth of each textured spot is controlled by varying the power of the laser pulses, this depth of spots on each side of the disk 128, 128*b* is used to adjust the operating level the corresponding liquid crystal variable retarder 136*b* by controlling the voltage output of an associated function generator 137 through a digital-to-analog convertor 256. It is understood that, while these process controls are considered exemplary, a number of other controls over the texturing process may be varied through the use of the interferometers 126, 126a and the computing system 223.

Despite the fact that changes are being made on the process texturing a disk in a real time basis, separate files are preferably kept within memory 223b for the application of the texturing process to disks on right spindle 128a and on left spindle 128c. Thus, the parameters determined to be correct by the end of the process of texturing a disk on right spindle 128a may be used to begin the process of texturing the next disk on right spindle 128a, while the parameters determined to be correct by the end of the process of texturing a disk on left spindle 128c is used to begin the process of texturing the next disk on this spindle 128c. Since the spindles 128a, 128c are used in an alternating fashion, the values of these parameters for a disk on each spindle must be stored as a disk is textured on the other spindle. Furthermore, the use of separate files for processing disks on each spindle allows the storage of different ideal and initial values for parameters, so that disks of differing materials, or disks to be textured to differing specifications may be processed on the two spindles 128a, 128c.

While the invention has been described in a form simultaneously texturing both sides of an individual disk, it is understood that the invention can readily be applied to a system texturing only one side of an individual disk at a time.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Apparatus for generating a first plurality of textured spots extending along a surface of each disk within a first plurality of disks and a second plurality of textured spots extending along a surface of each disk within a second plurality of disks, wherein said apparatus comprises:
    a texturing laser generating a texturing laser beam composed of a series of pulses
    beam directing means for directing said texturing laser beam, wherein said beam directing means is movable between a first position, in which said laser beam is directed to a first exposure point, and a second position, in which said laser beam is directed to a second exposure point;
    first disk drive means moving an individual disk within said first plurality of disks past said first exposure point for exposure of a portion of a surface of said individual disk within said first plurality of disks to said texturing laser beam with said beam directing means in said first position;
    second disk drive means moving an individual disk within said second plurality of disks past said second exposure point for exposure of a portion of a surface of said individual disk within said second plurality of disks to said texturing laser beam with said beam directing means in said second position; and
    process control means adjusting a first parameter controlling a characteristic of said texturing laser beam striking disks within said first and second pluralities thereof, wherein said process control means adjusts said first parameter in accordance with a position of said beam directing means.

2. The apparatus of claim 1, wherein said process control means adjusts said first parameter to a first level when said beam directing means is in said first position and to a second level when said beam directing means is in said second position.

3. The apparatus of claim 2:
    wherein said first parameter is a level of attenuation of said texturing laser beam; and
    wherein said characteristic of said texturing laser beam is a power level of said texturing laser beam striking a disk being textured.

4. The apparatus of claim 3, wherein said level of attenuation is adjusted by varying a signal driving a liquid crystal variable retarder.

5. The apparatus of claim 2:
    wherein said first parameter is a duty cycle of a pulse generator driving an oscillator to operate a Q-switch within said texturing laser; and
    wherein said characteristic of said texturing laser beam is a shape of pulses therein.

6. The apparatus of claim 2, wherein said process control means includes a computing system having:
    a memory in which said first and second levels of said first parameter are stored; and
    output means driving a circuit controlling said first parameter.

7. The apparatus of claim 1:
    wherein said apparatus additionally includes a first inspection device generating first signals representative of profiles of said textured spots on said surface of said individual disk within said first plurality of disks, and a second inspection device generating second signals representative of profiles of said textured spots said surface of said individual on said disk within said second plurality of disks; and
    wherein said process control means additionally calculates surface profile data from said first and second signals, using said profile data calculated from said first signals to adjust a first level of said first parameter, and using profile data calculated from said second signals to adjust a second level of said first parameter.

8. The apparatus of claim 7:
    wherein said process control means includes a computing system having a memory and output means driving a circuit controlling said first parameter; and
    wherein said first and second levels of said first parameter are stored within said memory, with said first level thereof, calculated during processing of said individual disk within said first plurality of disks, being subsequently used as an initial value of said first parameter during subsequent processing of another disk within said first plurality thereof, and with said second level of said first parameter, calculated during processing of said individual disk within said second plurality of disks, being subsequently used as an initial value of said first parameter during subsequent processing of another disk within said second plurality thereof.

9. The apparatus of claim 8:
    wherein said first parameter is a level of attenuation of said texturing laser beam; and
    wherein said characteristic of said texturing laser beam is a power level of said texturing laser beam striking a disk being textured.

10. The apparatus of claim 9, wherein said level of attenuation is adjusted by varying a signal driving a liquid crystal variable retarder.

11. The apparatus of claim 8:
wherein said first parameter is a duty cycle of a pulse generator driving an oscillator to operate a Q-switch within said texturing laser; and
wherein said characteristic of said texturing laser beam is a shape of pulses therein.

12. The apparatus of claim 7:
wherein said first inspection device includes an interferometer projecting laser sub-beams at first and second test spots on said individual disk within said first plurality of disks;
wherein said second inspection device includes an interferometer projecting laser sub-beams at third and fourth test spots on said individual disk within said second plurality of disks;
wherein said individual disk within said first plurality of disks is moved so that said textured spots thereon are moved through said first test spot while said second test spot remains on a flat surface of said individual disk within said first plurality of disks;
wherein said individual disk within said second plurality of disks is moved so that said textured spots thereon are moved through said third test spot while said fourth test spot remains on a flat surface of said individual diskwitnin said second plurality of disks;
wherein said first signals represent a height difference between said first and second test spots; and
wherein said second signals represent a height difference between said third and fourth test spots.

13. Apparatus for generating textured spots extending along opposite sides of each disk within a first plurality of disks and of each disk within a second plurality thereof, wherein said apparatus comprises:
a texturing laser generating a texturing laser beam composed of a series of pulses;
a beamsplitter dividing said texturing laser beam into first and second texturing sub-beams;
beam directing means for directing said texturing sub-beams, wherein said beam directing means is movable between a first position, in which said first texturing sub-beam is directed to a first exposure point and said second texturing sub-beam is directed to a second exposure point, and a second position, in which said first texturing sub-beam is directed to a third exposure point and said second texturing sub-beam is directed to a fourth exposure point;
first disk drive means moving an individual disk within said first plurality of disks so that a first side of said individual disk within said first plurality of disks moves past said first exposure point while a second side of said individual disk within said first plurality of disks, opposite said first side thereof, moves past said second exposure point, with textured spots simultaneously being formed on both sides of said individual disk within said first plurality of disks;
second disk drive means moving an individual disk within said second plurality so that a first side of said individual disk within said second plurality of disks moves past said third exposure point while a second side of said individual disk, opposite said first side thereof, moves past said fourth exposure point, with textured spots simultaneously being formed on both sides of said individual disk within said second plurality of disks; and
process control means adjusting a first parameter controlling a characteristic of a sub-beam striking disks within said first and second pluralities of disks, wherein said process control means adjusts said first parameter in accordance with a position of said beam directing means.

14. The apparatus of claim 13:
wherein said first parameter controls a characteristic of both said first and second sub-beams; and
wherein said process control means adjusts said first parameter to a first level when said beam directing means is in said first position and to a second level when said beam directing means is in said second position.

15. The apparatus of claim 14:
wherein said first parameter is a duty cycle of a pulse generator driving an oscillator to operate a Q-switch within said texturing laser; and
wherein said characteristic of said texturing laser beam is a shape of pulses therein.

16. The apparatus of claim 13:
wherein said first parameter controls a characteristic of said first texturing sub-beam;
wherein a second parameter controls a characteristic of said second texturing sub-beam;
wherein said process control means adjusts said first parameter to a first level and said second parameter to a second level when said beam directing means is in said first position; and
wherein said process control means adjust said first parameter to a third level and said second parameter to a fourth level when said beam directing means is in said second position.

17. The apparatus of claim 16:
wherein said first parameter is a level of attenuation of said first texturing sub-beam;
wherein said second parameter is a level of attenuation of said second texturing sub-beam;
wherein said characteristic of said first texturing sub-beam is a power level thereof; and
wherein said characteristic of said second texturing sub-beam is a power level thereof.

18. The apparatus of claim 17, wherein each said level of attenuation is adjusted by varying a signal driving a liquid crystal variable retarder.

19. The apparatus of claim 13:
wherein said apparatus additionally includes a first inspection device generating first signals representative of profiles of said textured spots on said first side of said individual disk within said first plurality of disks, a second inspection device generating second signals representative of profiles of said textured spots on said second side of said individual disk within said first plurality of disks, a third inspection device generating third signals representative of profiles of said textured spots on said first side of said individual disk within said second plurality of disks, and a fourth inspection device generating fourth signals representative of profiles of said textured spots on said second side of said individual disk within said second plurality of disks;
wherein said first parameter controls a characteristic of said first texturing sub-beam;
wherein a second parameter controls a characteristic of said second texturing sub-beam;
wherein said process control means additionally calculates surface profile data from said first, second, third, and fourth signals, using said profile data calculated from said first signals to calculate a first level of said first parameter, using said profile data calculated from said second signals to calculate a first level of said second parameter, using said profile data calculated from said third signals to calculate a second level of said first parameter, and using said profile data calculated from said fourth signals to calculate a second level of said second parameter.

20. The apparatus of claim 19:

wherein said process control means includes a computing system having a memory and output means driving a circuit controlling said first and second parameters;

wherein said first and second levels of said first parameter are stored within said memory, with said first level thereof, calculated during processing of said disk within said first plurality thereof, being subsequently used as an initial value of said first parameter during subsequent processing of another disk within said first plurality thereof, and with said second level of said first parameter, calculated during processing of said disk within said second plurality thereof, being subsequently used as an initial value of said first parameter during subsequent processing of another disk within said second plurality thereof; and wherein said first and second levels of said second parameter are stored within said memory, with said first level thereof, calculated during processing of said disk within said first plurality thereof, being subsequently used as an initial value of said second parameter during subsequent processing of another disk within said first plurality thereof, and with said second level of said second parameter, calculated during processing of said disk within said second plurality thereof, being subsequently used as an initial value of said second parameter during subsequent processing of another disk within said second plurality thereof.

21. The apparatus of claim 20:

wherein said first parameter is a level of attenuation of said first texturing sub-beam;

wherein said second parameter is a level of attenuation of said second texturing sub-beam;

wherein said characteristic of said first texturing sub-beam is a power level of said first texturing sub-beam striking said disk; and wherein said characteristic of said second texturing sub-beam is a power level of said second texturing sub-beam striking said disk.

22. The apparatus of claim 19:

wherein said first parameter is adjusted by varying a signal driving a first liquid crystal variable retarder; and wherein said second parameter is adjusted by varying a signal driving a second liquid crystal variable retarder.

* * * * *